United States Patent

Garofalo et al.

Patent Number: 5,947,351
Date of Patent: Sep. 7, 1999

[54] CYLINDER CARRIER

[76] Inventors: Michael J. Garofalo; Gerri M. Citrigno, both of 9821 Dungan Rd., Philadelphia, Pa. 19115

[21] Appl. No.: 08/951,729

[22] Filed: Oct. 16, 1997

[51] Int. Cl.[6] .............................. A45F 4/02; A45F 5/00; B62B 1/00
[52] U.S. Cl. ................... 224/153; 224/633; 224/634; 224/261; 224/934; 294/159; 294/169; 280/47.315; 280/47.29; 40/299.01
[58] Field of Search ............................ 224/153, 633, 224/634, 261, 934; 294/150, 153, 154, 157, 159, 141, 143, 162, 163, 160, 167, 168, 169; 40/306, 638, 229.01; 280/47.17, 47.18, 47.19, 47.2, 47.21, 47.22, 47.23, 47.24, 47.25, 47.26, 47.27, 47.28, 47.29

[56] References Cited

U.S. PATENT DOCUMENTS

| D. 243,530 | 3/1977 | Bodine et al. | D23/2 |
|---|---|---|---|
| 613,973 | 11/1898 | Corlew | 294/169 |
| 2,401,986 | 6/1946 | Talbott | 224/153 |
| 3,471,163 | 10/1969 | Swara | 280/47.26 |
| 3,698,480 | 10/1972 | Newton | 169/1 A |
| 4,049,164 | 9/1977 | Sullivan et al. | 224/633 |
| 4,235,331 | 11/1980 | Bates, III et al. | 294/169 |
| 4,294,463 | 10/1981 | Kotani | 280/47.29 |
| 4,294,481 | 10/1981 | Pearl | 294/159 |
| 4,657,295 | 4/1987 | Holem | 294/162 |
| 4,753,445 | 6/1988 | Ferrare | 280/47.17 |
| 5,396,885 | 3/1995 | Nelson | 128/204.18 |
| 5,427,494 | 6/1995 | Fitgerald | 414/459 |
| 5,437,199 | 8/1995 | Kaplan | 73/863.23 |

*Primary Examiner*—Linda J. Sholl
*Attorney, Agent, or Firm*—David L. Volk

[57] ABSTRACT

An elongated post includes a sleeve and an extension, the extension slidably retained within the sleeve. A handle is disposed at a free end of the extension. The sleeve has a first end near the handle and a second end opposite the first end. A pair of cylinder rests is provided, one each of the rests positioned on each of two opposite sides of the sleeve at the second end of the sleeve. The cylinder rests are foldable against the sleeve. A pair of cylinder straps is disposed on each side of the sleeve. Each pair of cylinder straps is adapted for holding a cylinder to the post, such that a distal end of the cylinder rests against one of the cylinder rests. The cylinder straps are foldable against the sleeve. A pair of shoulder straps is attached to the post for wearing the post on a human back. A pair of wheels is disposed at the second end of the sleeve. The post is inscribed with indicia indicating an empty cylinder near the first end of the sleeve, and indicia indicating a filled cylinder near the second end of the sleeve. A person can place the cylinder within the cylinder with a neck of the cylinder disposed near the first end or the second end of the sleeve, to indicate whether the cylinder is empty or filled.

2 Claims, 3 Drawing Sheets

CYLINDER CARRIER

BACKGROUND OF THE INVENTION

1. Field of the Invention

The present invention relates to carriers, particularly to a carrier for cylinders such as air filled cylinders.

2. Description of the Related Art

When fires occur in multi-story buildings, fire fighters must carry air filled cylinders into the building, to the floor below the fire. These are provided for the use of the fire fighters on the fire floor, who will come down to the floor below the fire to get the air filled cylinders.

Until now, fire fighters carried the cylinders by hand, usually grasping the neck of the cylinder between the fingers of the hand. This limits the amount of cylinders a fire fighter can carry, and can be very tiring, especially in high-rise buildings.

What is needed is a carrier for cylinders, which is lightweight, convenient and portable, and which can carry several cylinders at once by a variety of means. Such an invention would also find use in many applications other than fire fighting.

SUMMARY OF THE INVENTION

The cylinder carrier of the present invention includes an elongated post having a sleeve and an extension. The extension is slidably retained within the sleeve. A handle is disposed at a free end of the extension. The sleeve has a first end near the handle and a second end opposite the first end.

A pair of cylinder rests is provided, one each of the rests positioned on each of two opposite sides of the sleeve at the second end of the sleeve. The cylinder rests are foldable against the sleeve. A pair of cylinder straps is disposed on each side of the sleeve. Each pair of cylinder straps is adapted for holding a cylinder to the post, such that a distal end of the cylinder rests against one of the cylinder rests. The cylinder straps are foldable against the sleeve.

A pair of shoulder straps is attached to the post for wearing the post on a human back. A pair of wheels is disposed at the second end of the sleeve.

The post is inscribed with indicia indicating an empty cylinder near the first end of the sleeve, and indicia indicating a filled cylinder near the second end of the sleeve. A person can place the cylinder within the cylinder carrier with a neck of the cylinder disposed near the first end or the second end of the sleeve, to indicate whether the cylinder is empty or filled.

Because the extension is slidable within the sleeve, and has a handle on the free end, and because wheels are provided at the second end of the sleeve, the handle may be extended from the sleeve to transport the cylinder carrier on the wheels like a dolly. The handle may also be retracted into the sleeve to carry the cylinder carrier by the handle without the use of the wheels.

Because the cylinder rests are provided, the distal ends of the cylinders are protected from damage.

Because the handle is retractable, and because the cylinder rests and the cylinder straps are foldable against the sleeve, the cylinder carrier is compact and easily transportable when no cylinders are being carried.

Because shoulder straps are provided, a person has the option of carrying the cylinder carrier and the cylinders on his back.

Still further features and advantages will become apparent from the ensuing description and drawings.

DETAILED DESCRIPTION

Figure 1:
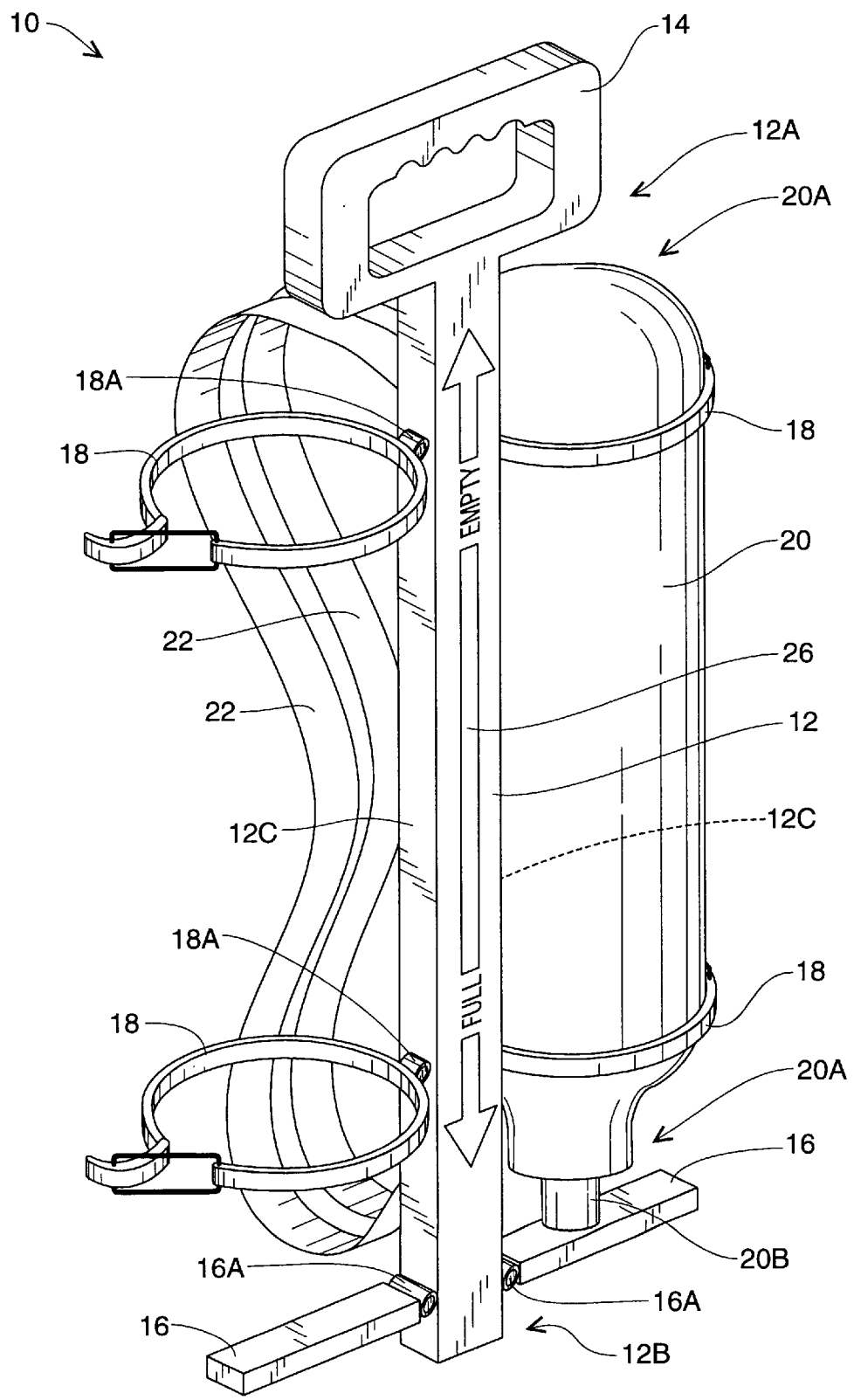
FIG. 1 is a perspective view of a first embodiment of a cylinder carrier of the present invention.

FIG. 1 is a perspective view of a first embodiment of a cylinder carrier 10 of the present invention. The cylinder carrier 10 includes an elongated post 12 having a handle 14 at a first end 12A of the post 12.

Figure 1A:
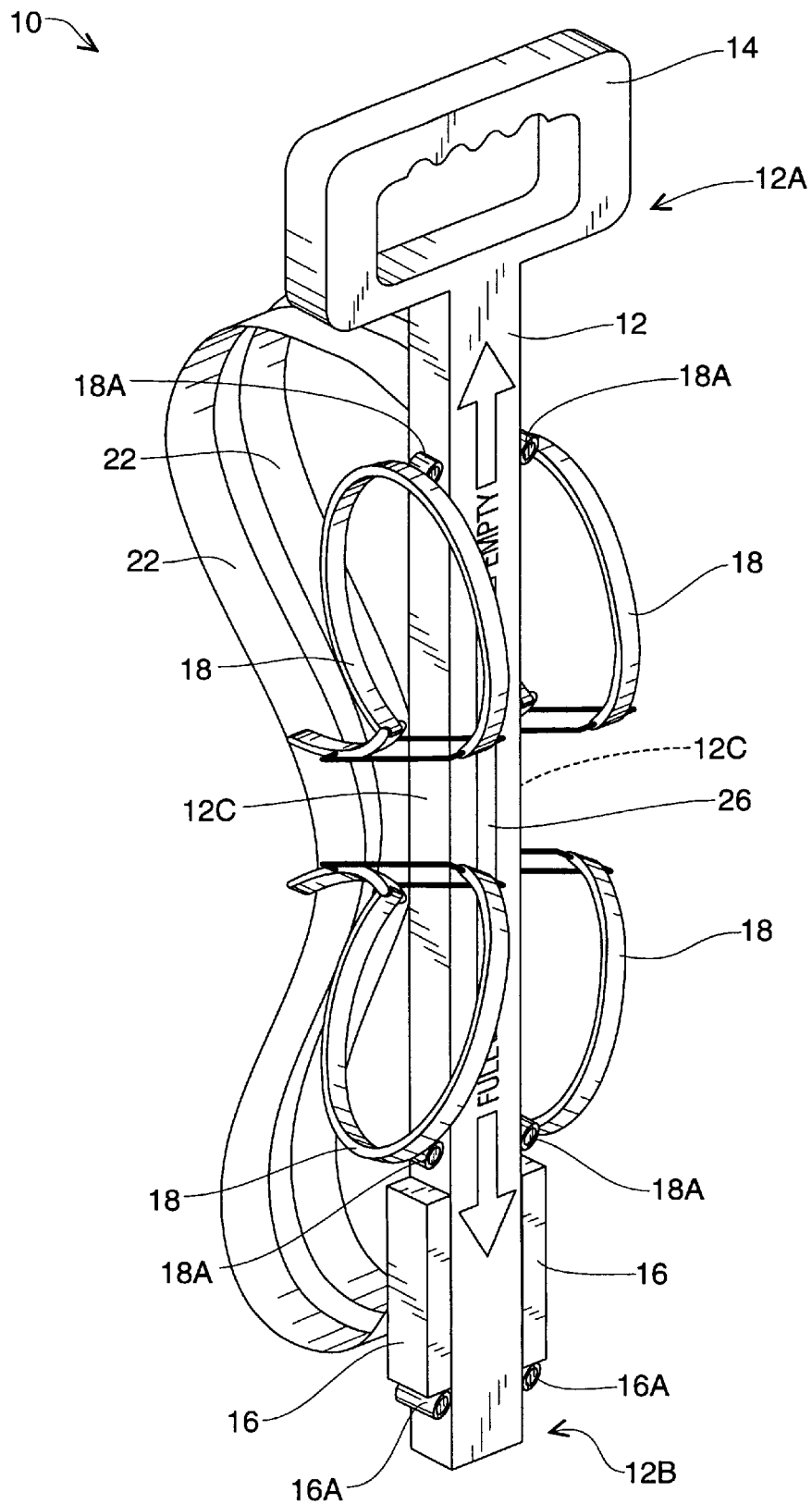
FIG. 1A is a perspective view of the first embodiment of the cylinder carrier, with the cylinder rests and the cylinder straps in a folded position.

A pair of cylinder rests 16 is provided. One each of the rests 16 is positioned on each of two opposite sides 12C of the post 12 at a second end 12B of the post 12. The cylinder rests 16 are foldable against the post 12, about rest hinges 16A, as shown in FIG. 1A.

A pair of cylinder straps 18 is disposed on each side 12C of the post 12. Each pair of cylinder straps 18 is adapted for holding a cylinder 20 to the post 12 in a conventional manner, such that a distal end 20A of the cylinder 20 rests against one of the cylinder rests 16. The cylinder straps 18 are foldable against the post 12, about strap hinges 18A, as shown in FIG. 1A.

A pair of shoulder straps 22 is attached to the post 12 for wearing the post 12 on a human back (not shown) in a conventional manner.

The post 12 is inscribed with indicia 26 indicating an empty cylinder near the first end 12A of the post 12, and indicia 26 indicating a filled cylinder near the second end 12B of the post. It is intended that if a person wishes to indicate that the cylinder 20 is empty, he or she would place the cylinder 20 within the cylinder carrier such that a neck 20B of the cylinder 20 is oriented toward the first end 12A of the post 12. To indicate that the cylinder 20 is filled, the cylinder 20 would be placed such that the neck 20B of the cylinder 20 is oriented toward the second end 12B of the post 12. This would be extremely helpful in the emergency situation of a fire, when time is of the essence, because no time would be lost picking up an empty cylinder when a filled cylinder is required.

Figure 2:
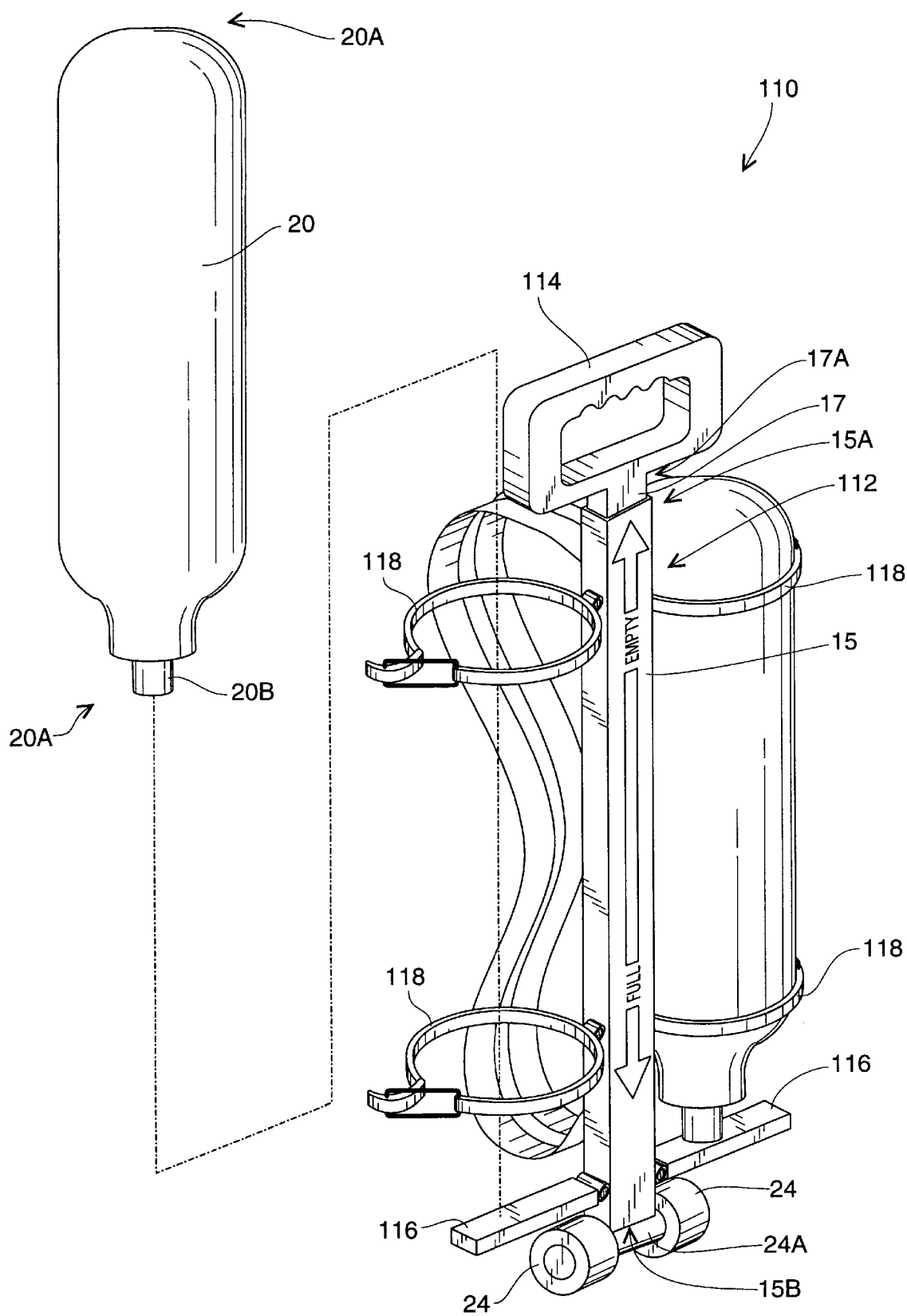
FIG. 2 is a perspective view of a second embodiment of the cylinder carrier.

FIG. 2 is a perspective view of a second embodiment of the cylinder carrier 110. This embodiment is similar to the first embodiment, except that the post 112 comprises a sleeve 15 and an extension 17, and wheels 24 are attached to the sleeve 15. The extension 17 is slidably retained within the sleeve 15 in a conventional manner. The extension 17 is extendable and retractable within the sleeve 15. A conventional securing means (not shown) including but not limited to a pin, latch or detente mechanism can be provided to secure the extension 17 within the sleeve 15 in the fully retracted position, the fully extended position, and/or any intermediate position, as desired.

A handle 114 is disposed at a free end 17A of the extension 17. In a similar manner to the first embodiment, cylinder rests 116 and cylinder straps 118 are foldable against the sleeve 15.

The sleeve 15 has a first end 15A near the handle 114 and a second end 15B opposite the first end 15A. An axle 24A is disposed at the second end 15B of the sleeve 15, to which the wheels 24 are attached in a conventional manner. The wheels 24 are positioned inboard of the distal ends of the rests 116 when the rests 116 are extended outwardly from the sleeve 15 as shown in FIG. 2.

The foregoing description is included to describe embodiments of the present invention which include the preferred embodiment, and is not meant to limit the scope of the invention.

From the foregoing description, many variations will be apparent to those skilled in the art that would be encompassed by the spirit and scope of the invention. For example, and not by way of limitation, the strap hinges 18A may be deleted (with a corresponding loss in utility), and the cylinder straps 18 may be of a different conventional configuration, and may be secured about the cylinders 20 by hook and loop fasteners or other conventional means.

Accordingly, the scope of the invention is to be limited only by the following claims and their legal equivalents.

The invention claimed is:

1. A cylinder carrier comprising:
   a. an elongated post comprising a sleeve and an extension, the extension slidably retained within the sleeve;
   b. a handle at a free end of the extension;
   c. the sleeve having a first end near the handle and a second end opposite the first end;
   d. a pair of cylinder rests, one each of the rests positioned on each of two opposite sides of the sleeve at the second end of the sleeve;
   e. the cylinder rests being foldable from a first position against and substantially parallel to the sleeve to a second position extending outwardly at a substantially perpendicular angle from the sleeve;
   f. a pair of cylinder straps on each side of the sleeve, each pair of cylinder straps adapted for holding a cylinder to the post, such that a longitudinal axis of the cylinder is generally parallel to the post, and such that a distal end of the cylinder rests against one of the cylinder rests;
   g. the cylinder straps being foldable from a first position against and substantially parallel to the sleeve to a second position extending outwardly at a substantially perpendicular angle from the sleeve;
   h. a pair of shoulder straps attached to the post and adapted for strapping the post to a person to wear the post on a human back;
   i. a pair of wheels disposed at the second end of the sleeve, the wheels positioned inboard of distal ends of the rests when the rests are extended outwardly from the post; and
   j. the post inscribed with indicia indicating an empty cylinder near one of the first and second ends of the sleeve, and indicia indicating a filled cylinder at an opposite one of the first and second ends of the sleeve, whereby a person can place the cylinder within the cylinder carrier in a selected orientation to indicate whether the cylinder is empty or filled.

2. A cylinder carrier comprising:
   a. an elongated post having a first end and a second end;
   b. a handle disposed at the first end of the post;
   c. a pair of cylinder rests, one each of the rests positioned on each of two opposite sides of the post at the second end of the post; and
   d. cylinder holding means for holding a pair of cylinders to the post, such that one each of the cylinders is disposed on each of the two opposite sides of the elongated post, and such that a longitudinal axis of each of the cylinders is generally parallel to the post, and such that a distal end of each of the cylinders rests against each of the cylinder rests; and
   e. the post being inscribed with indicia indicating an empty cylinder near one of the first and second ends of the post, and indicia indicating a filled cylinder at an opposite one of the first and second ends of the post, whereby a person can place the cylinder within the cylinder carrier in a selected orientation to indicate whether the cylinder is empty or filled.

* * * * *